United States Patent
Lachwani et al.

(10) Patent No.: US 10,462,029 B2
(45) Date of Patent: *Oct. 29, 2019

(54) DEVICE CLOUD MONITORING AND STABILITY

(71) Applicant: GOOGLE LLC, Mountain View, CA (US)

(72) Inventors: Manish Lachwani, Sunnyvale, CA (US); Pratyus Patnaik, San Francisco, CA (US); Abhinav Singh, Uttar Pradesh (IN); Mark Larson, San Carlos, CA (US); Chase Phillips, Pacifica, CA (US)

(73) Assignee: Google LLC, Mountain View, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/635,397

(22) Filed: Jun. 28, 2017

(65) Prior Publication Data
US 2017/0302545 A1    Oct. 19, 2017

Related U.S. Application Data

(63) Continuation of application No. 14/564,313, filed on Dec. 9, 2014, now Pat. No. 9,720,810.

(51) Int. Cl.
*G06F 11/00* (2006.01)
*H04L 12/26* (2006.01)
*G06F 11/36* (2006.01)
(Continued)

(52) U.S. Cl.
CPC ............ *H04L 43/0811* (2013.01); *G06F 8/41* (2013.01); *G06F 8/71* (2013.01); *G06F 11/3058* (2013.01);
(Continued)

(58) Field of Classification Search
USPC ...................................................... 714/38.14
See application file for complete search history.

(56) References Cited

U.S. PATENT DOCUMENTS 6,697,973 B1    2/2004  Baumeister et al.
8,621,062 B1   12/2013  Anderson et al.
(Continued)

OTHER PUBLICATIONS

Dictionary definition of "deadlock", retrieved from wikipedia on Apr. 1, 2017, from "https://en.wikipedia.org/wiki/Deadlock".

*Primary Examiner* — Yair Leibovich
(74) *Attorney, Agent, or Firm* — McDonnell Boehnen Hulbert & Berghoff LLP

(57) ABSTRACT

An example system may include a first device connected over respective communications interfaces to a plurality of second devices. The first device may establish respective remote terminals between the first device and one or more second devices. Establishing the respective remote terminals may indicate that the devices are in an online state. The first device may periodically update respective heartbeat files on the second devices. A respective second device may detect that a pre-determined time period has elapsed since the heartbeat file was updated. The respective second device may determine that a respective remote terminal between the first device and the respective second device has been terminated. Determining that the remote terminal has been terminated may indicate that the device is in an offline state. The respective second device may reset itself so as to transition the respective second device from the offline state to the online state.

20 Claims, 8 Drawing Sheets

(51) Int. Cl.
  *H04L 12/24* (2006.01)
  *G06F 8/41* (2018.01)
  *G06F 8/71* (2018.01)
  *H04L 29/08* (2006.01)
  *G06F 11/30* (2006.01)
  *G06F 8/30* (2018.01)

(52) U.S. Cl.
  CPC ...... *G06F 11/3664* (2013.01); *G06F 11/3688* (2013.01); *H04L 41/0672* (2013.01); *H04L 43/0817* (2013.01); *H04L 43/0823* (2013.01); *H04L 43/10* (2013.01); *H04L 43/50* (2013.01); *H04L 67/025* (2013.01); *G06F 8/30* (2013.01)

(56) References Cited

U.S. PATENT DOCUMENTS

| | | | |
|---|---|---|---|
| 8,707,082 B1 | 4/2014 | Chen et al. | |
| 8,966,318 B1 | 2/2015 | Shah | |
| 9,720,810 B2 * | 8/2017 | Lachwani | G06F 11/3664 |
| 10,248,465 B2 * | 4/2019 | Tanttu | G06F 9/5038 |
| 2004/0010544 A1 * | 1/2004 | Slater | G06F 11/3433 709/203 |
| 2004/0111513 A1 * | 6/2004 | Shen | H04L 29/06 709/226 |
| 2006/0255770 A1 * | 11/2006 | Rocher | H02J 7/0065 320/144 |
| 2010/0169409 A1 | 7/2010 | Fallon et al. | |
| 2012/0117239 A1 | 5/2012 | Holloway et al. | |
| 2012/0240119 A1 | 9/2012 | Xie et al. | |
| 2014/0215082 A1 | 7/2014 | Backholm | |
| 2014/0366034 A1 * | 12/2014 | Fujisawa | G06F 9/5016 718/104 |
| 2016/0072730 A1 * | 3/2016 | Jubran | H04L 43/50 709/224 |
| 2016/0162389 A1 | 6/2016 | Lachwani et al. | |

* cited by examiner

DEVICE CLOUD MONITORING AND STABILITY

CROSS REFERENCE TO RELATED APPLICATION

The present application is a continuation of U.S. patent application Ser. No. 14/564,313, filed on Dec. 9, 2014, the entire contents of which are herein incorporated by reference.

BACKGROUND

Unless otherwise indicated herein, the materials described in this section are not prior art to the claims in this application and are not admitted to be prior art by inclusion in this section.

With the growing popularity of computing devices, there is an increasing demand for applications, or apps, to operate on such devices. These computing devices may include, for example, smartphones, tablet computers, televisions, set-top boxes, in-vehicle computer systems, home entertainment systems, and so forth. To satisfy this demand, programmers are building, testing, and maintaining applications. Testing of these applications is useful for quality assurance to find and correct errors.

BRIEF SUMMARY

In one example, a system is provided that may include a first computing device connected over respective communications interfaces to a plurality of second computing devices. The first computing device may be configured to perform operations. The operations may include establishing, over the respective communications interfaces, respective remote terminals between the first computing device and one or more second computing devices of the plurality of second computing devices. Establishing the respective remote terminals may indicate that the one or more second computing devices are in an online state in which application tests are able to be performed via the respective remote terminals. The operations may also include periodically updating, via the respective remote terminals, respective heartbeat files on the second computing devices. A given heartbeat file may indicate a time at which the heartbeat file was last updated. The one or more second computing devices may also be configured to perform operations. The operations may include detecting that a pre-determined period of time has elapsed since the heartbeat file was updated. The operations may also include determining that a respective remote terminal between the first computing device and a respective second computing device has been terminated. Determining that the remote terminal has been terminated indicates that the respective second computing device is in an offline state in which application tests are unable to be performed via the respective remote terminal. The operations may further include resetting the respective second computing device so as to transition the respective second computing device from the offline state to the online state.

In another example, a method is provided. The method may involve establishing respective remote sessions between a first computing device and a plurality of second computing devices. Establishing the respective remote sessions may indicate that the second computing devices of the plurality are in an online state in which application tests are able to be performed via the respective remote sessions. The method may further involve causing execution, via the respective remote sessions, of respective test applications on one or more second computing devices. The method may also involve determining that respective modules of the one or more second computing devices are preventing the respective test applications from executing. Determining that the respective modules are preventing the respective test applications from executing may indicate that the one or more second computing devices are in an offline state in which application tests are unable to be performed via the respective remote sessions. The method may involve resetting the one or more second computing devices so as to transition the one or more second computing devices from the offline state to the online state.

In another example, a computing system is provided that includes one or more processors and data storage configured to store instructions, that when executed by the one or more processors, cause the computing system to perform operations. The operations may include establishing respective remote sessions between a first computing device and a plurality of second computing devices. Establishing the respective remote sessions may indicate that the second computing devices of the plurality are in an online state in which application tests are able to be performed via the respective remote sessions. The operations may further include causing execution, via the respective remote sessions, of respective test applications on one or more second computing devices. The operations may also include determining that respective modules of the one or more second computing devices are preventing the respective test applications from executing. Determining that the respective modules are preventing the respective test applications from executing may indicate that the one or more second computing devices are in an offline state in which application tests are unable to be performed via the respective remote sessions. The operations may include resetting the one or more second computing devices so as to transition the one or more second computing devices from the offline state to the online state.

In another example, a computer readable storage memory is provided that has stored therein instructions, that when executed by a processor, cause the processor to perform functions. The functions may include establishing respective remote sessions between a first computing device and a plurality of second computing devices. Establishing the respective remote sessions may indicate that the second computing devices of the plurality are in an online state in which application tests are able to be performed via the respective remote sessions. The function may further include causing execution, via the respective remote sessions, of respective test applications on one or more second computing devices. The functions may also include determining that respective modules of the one or more second computing devices are preventing the respective test applications from executing. Determining that the respective modules are preventing the respective test applications from executing may indicate that the one or more second computing devices are in an offline state in which application tests are unable to be performed via the respective remote sessions. The functions may include resetting the one or more second computing devices so as to transition the one or more second computing devices from the offline state to the online state.

In yet another example, a system is provided that may include a first computing device connected over respective communications interfaces to a plurality of second computing devices. The system may include a means-for establishing, over the respective communications interfaces, respective remote terminals between the first computing device and one or more second computing devices of the plurality of second computing devices. Establishing the respective remote terminals may indicate that the one or more second computing devices are in an online state in which application tests are able to be performed via the respective remote terminals. The system may also include a means-for periodically updating, via the respective remote terminals, respective heartbeat files on the second computing devices, wherein a given heartbeat file indicates a time at which the heartbeat file was last updated. The system may also include a means-for detecting that a pre-determined period of time has elapsed since the heartbeat file was updated. The system may further include a means-for determining that a respective remote terminal between the first computing device and a respective second computing device has been terminated. Determining that the remote terminal has been terminated may indicate that the respective second computing device is in an offline state in which application tests are unable to be performed via the respective remote terminal. The system may also include a means-for resetting the respective second computing device so as to transition the respective second computing device from the offline state to the online state.

These as well as other aspects, advantages, and alternatives, will become apparent to those of ordinary skill in the art by reading the following detailed description, with reference where appropriate to the accompanying figures.

DETAILED DESCRIPTION

Figure 1:
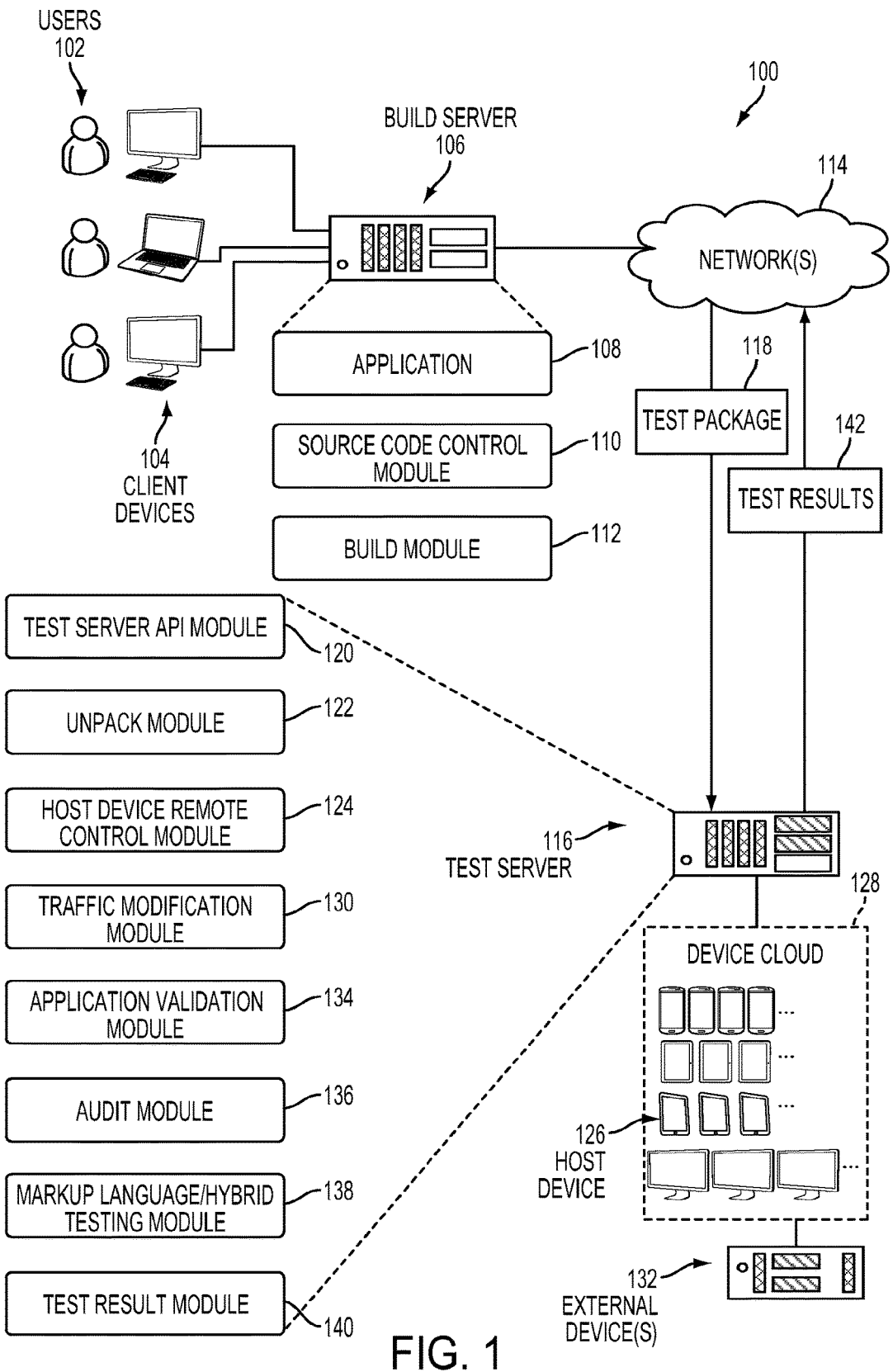
FIG. 1 depicts an example system for integrating testing of applications provided by a build server on one or more remote host devices.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A wide variety of applications (or "apps") are developed for execution on computing devices such as smartphones, tablet computers, televisions, set-top boxes, in-vehicle computer systems, home entertainment systems, and so forth.

There is an increasing demand for software users to build apps to run on such devices. Software developers build, test, and maintain applications using a variety of development and build tools. Testing of such an application may provide benefits such as finding and correcting errors in code of the application, improving performance of the application, and so forth. Testing may include observing processor usage, observing memory allocation, programmatic debugging, determining usability, validating functionality, identifying regressions, and so forth.

Some application development methodologies, such as continuous integration, encourage frequent testing of ongoing builds of an application. For example, code for an application may be checked into a build server thereby creating a build. Such a build may then be used for ongoing development, troubleshooting, testing, and so forth. By increasing the frequency of builds of the application, problems with a build may be identified more quickly and the application development process may be improved.

Traditional testing systems may lack the ability to provide development tools for testing of applications executing on computing devices. Software users may rely on alternate methods for testing, including use of software simulators, manually provisioning and testing on computing devices connected to a particular user's desktop computer, and so forth. However, simulators may lack the full feature set provided by execution on the actual computing device, resulting in incomplete testing. Further, manual provisioning and testing with a connected computing device may be time intensive and may result in the user's development computer being occupied with running the testing process in conjunction with the connected computing device.

Within examples, systems and methods for maintenance of one or more actual computing devices, also known as host devices, on which apps may be tested are described. In combination, these computing devices may be referred to as a "device cloud." In an example system, a test server might be connected to a plurality of such host devices. The test server may receive applications for testing, possibly from a build server configured to build test applications from source code provided to the build server from a development computer. Applications for testing on the device cloud may be referred to as test packages or as applications-under-test. The test server may then deploy the applications to one or more host devices testing, which may involve executing the application and observing various aspects of its execution.

Operation of such a device cloud for application testing may, in some examples, require keeping the host devices available for testing (i.e., maintaining relatively high uptime of the device cloud). Some test packages provided to the host devices may have errors and bugs that might cause the host devices to crash during execution of the test package. Such a crash may break the connection between the host device and the test server. The host device might then be unavailable for further application testing. Test packages may interfere with the operation of host devices in various ways, such as by disabling wireless communication interfaces (e.g., an IEEE 802.11 (WIFI®) interface), by using a disproportionate share of system resources, or by disrupting various services used in testing, among other examples.

Example systems and techniques described herein may facilitate maintenance of a device cloud. An example system may include a first computing device (e.g., a test server) connected over respective communications interfaces to a plurality of second computing devices (e.g., a plurality of host devices). In operation, a given second computing device may be considered to be either an online state or an offline state. In the online state, the second computing device is considered able to perform application tests. Conversely, in the offline state, the second computing device considered unable to perform application tests.

Example techniques described herein may involve identifying various conditions that may indicate that a given second computing device is in the offline state. Such conditions may include inaccessibility by the first computing device over the communications interface, inability to install or execute applications, disrupted services, or malfunctioning hardware modules, among other examples. Under such conditions, the example techniques may further involve resetting the second device so as to "self-heal" the second device by transitioning the second device from the offline state to the online state.

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

Referring now to the figures, FIG. 1 illustrates an example system 100 for testing of applications on remote host devices. One or more users 102, such as software developers, may use one or more client devices 104 coupled to a build server 106 to work with an application 108. The application 108 may include an application which is undergoing initial development, ongoing development, maintenance, and so forth.

The application 108 may be a native app, a markup language application, hybrid app, or a browser-based application. Native applications are those which are written and compiled for execution on the particular device. For example, native applications may be written in a programming language such as C++ or Objective C and compiled into native code such as a binary executable for use on the device. Markup language applications include one or more instructions in a markup language which may be rendered by a layout engine and one or more instructions in a scripting language which may be interpreted by a scripting language engine during execution. For example, a hypertext markup language ("HTML") version 5 (or greater) markup language application may include HTML, cascading style sheets ("CSS"), and JavaScript. In some implementations the markup language application may have multiple instances of the UIWebView class references. Hybrid applications include native code and markup language application portions. Browser-based applications are processed within a web browser application and are limited in execution. The browser-based applications may have only a single UIWebView instance.

The build server 106 may include one or more modules such as a source code control module 110, build module 112, and so forth. The source code control module 110 may be configured to provide control of source code, check-in/check-out of source code to users 102, and so forth. The build module 112 is configured to take associated source code and generate a build of the application 108. The application 108 as built may include source code configured for execution on the host device. In some implementations the application 108 as built may include executable binaries, markup language applications, and so forth. In some implementations the users 102 may use the build server 106 to implement a continuous integration methodology of software development in which workspaces of the users 102 are merged frequently, such as several times per day.

The build server 106 may be configured to implement, or work in conjunction with systems implementing one or more software development tools.

The build server 106 may be configured to couple to one or more networks 114. The networks 114 may include public networks such as the Internet, private networks such as an institutional and/or personal intranet, or some combination of private and public networks. The networks 114 may also include any type of wired and/or wireless network, including but not limited to local area networks (LANs), wide area networks (WANs), Wi-Fi, WiMax, and mobile communications networks (e.g., 3G, 4G, and so forth). The networks 114 may utilize communications protocols, including packet-based and/or datagram-based protocols such as internet protocol (IP), transmission control protocol (TCP), user datagram protocol (UDP), or other types of protocols.

A test server 116 may also couple to the one or more networks 114. Communication may be established between the build server 106 and the test server 116. The build server 106 is configured to generate and send a test package 118 to the test server 116. The test package 118 may include the application build, tests, configuration data, build information, and so forth. The build server may send the test package 118 using a uniform resource locator ("URL") which is associated with a particular account on the test server 116. The URL used by the build server 106 to send the test package 118 may be unique to a particular user 102, group of users 102, build server 106, entity, organization, and so forth.

The test server 116 may include a test server API module 120 configured to accept and respond to the test package 118 sent by the build server 106. In one implementation, the test server API module 120 may implement a representational state transfer ("REST") responsive to data sent using a hypertext transfer protocol ("HTTP"). The exchange of information between the build server 106 and the test server 116 may be encrypted. For example, transfers of the test package 118 may use HTTP secure ("HTTPS").

As noted above, the build server 106 may be configured to implement, or work in conjunction with, various systems to support development. In one implementation the build server 106 may implement a build server system with plugins configured to interface with the test server 116 using the test server API module 120. The plugins may allow for opening a specific host device 126 with an installed specific build of the application 108 as a post build option. The plugins may also allow for automated calls to the test server 116 to interact with particular builds.

In some implementations the test server 116 may be configured to work with various software development tools. The test server 116, or portions thereof such as the test server API module 120, may be customized to allow for integration with particular users 102 or entities. Users 102 with appropriate access rights to these tools may able to make API calls to the test server 116 to allow for the selection of a particular application 108 for testing or other actions. The selection of the particular application 108 may be automated such that operation occurs without human intervention.

An unpack module 122 may be configured to unpack the test package 118. This unpacking may include one or more of separating out the executables, tests, configuration data, build information, and so forth.

A host device remote control module 124 may be configured to couple to one or more host devices 126 in a host device cloud 128. The host devices 126 may include smartphones, tablet computers, televisions, set-top boxes, in-vehicle computer systems, home entertainment systems, and so forth.

The host device cloud 128 may include different varieties of host devices 126. These varieties may reflect differences in hardware, software, configuration, and so forth. For example, the host device cloud 128 may include host devices 126 from manufacturer "A", manufacturer "B", and so forth. For instance, host devices 126 may include devices from multiple different manufactures. In addition, the host devices 126 may be based on one or more different platforms, or different operating systems.

Continuing the example, the host devices 126 from the manufacturer "A" may include tablet computers, smartphones, and so forth. Furthermore, these host devices 126 may be of different generations, capabilities, and so forth.

In some embodiments, the test server 116 may employ one or more communications interfaces that include an electrical or optical connection to couple to the one or more host devices 126 in the host device cloud 128. In one embodiment, respective universal serial bus ("USB") connections may be used to communicatively couple the one or more host devices 126 to the test server 116. The USB connection may be used to transfer data from the host device 126 to the test server 116 or another test server 116, perhaps using TCP as a communication protocol. The data may include the application 108, testing applications, screenshots, test results, diagnostic data, and so forth.

In some implementations, the USB connection may support data rates enabling a video stream from the host device 126 display to be provided to the test server 116 which is a high-fidelity representation of the images presented on the host device 126. Various implementations of USB, such as USB 1.0, 1.1, 2.0 or 3.0 and beyond may be used. In other implementations other connections may be used, including but not limited to high-definition multimedia interface (HDMI), Institute of Electrical and Electronics Engineers ("IEEE") 1394 interface, Ethernet, external serial attachment interface ("eSATA"), and so forth.

The host device remote control module 124 may be configured to send, using the communications interface, one or more instructions to an input virtualization module executing on at least a portion of the one or more host devices 126 in the host device farm 128. The one or more instructions are configured to perform at least one input event on the one or more host devices 126 during the execution of the application 108.

The host device remote control module 124 may provide other instructions to the host device 126. For example, the instructions may initiate one or more test applications, diagnostic functions, and so forth on the host device 126, such as described below.

The host device remote control module 124 may also be configured to receive information from the one or more host devices 126. This information may include diagnostic output, testing outputs, screenshots of one or more of the displays of the one or more host devices 126, and so forth. The screenshots may be stored as still images, or combined to form a video stream representative of information presented on the display of the host device 126. The screenshots generated as the one or more host devices 126 execute the application 108 may be received by the test server 116 for analysis, presentation to the user 102, stored, and so forth.

A traffic modification module 130 may be configured to modify communications between the host devices 126 and one or more external devices 132. The external devices 132 may include servers or other devices which are accessible using the one or more networks 114. As described above the networks 114 may include local or wide-area networks. The modification may be used to introduce into the testing environment of the application 108 conditions associated with different network conditions such as a particular carrier network, low signal strength, and so forth. The traffic modification module 130 may be configured with network profile data which may include network profile parameters. The network profile parameters are configured to instruct the traffic modification module 130 to modify at least a portion of network traffic between one or more of the host devices 126 and the external devices 132.

An application validation module 134 may also be provided in the test server 116. The application validation module 134 is configured to use assembly code data generated during execution of the application 108 on the host device 126 to generate object level hierarchy data associated with the application 108. The object level hierarchy data indicates a hierarchical association between a plurality of objects, based on one or more determined parent-child relationships between the objects. In some embodiments, the application validation module 134 may iteratively request portions of the assembly code data to analyze address data for objects listed in the assembly code data, determine parent-child relationships among the objects, or generate one or more object level hierarchies based on the objects and their relationships. As used herein, address data describes addresses for locations in virtual memory on the device where the application 108 is executing. Address data may also describe addresses for locations in active memory or program memory on a device.

Object level hierarchies for different application builds may be compared to identify differences between them. For example, differences between the current version and the previous version may be identified. Embodiments may identify one or more of differences in the number or identity of objects in the hierarchy, differences in the relationships between the objects, or differences in one or more attributes associated with the objects. In this way, embodiments may identify regressions or bugs in a particular feature set of the application 108 through comparison of object level hierarchies generated for multiple versions of the application 108. Information associated with the object level hierarchy may also be used to confirm compliance with target character sets (e.g., for localization of the application).

The test server 116 may also incorporate an audit module 136. The audit module 136 is configured to analyze object data resulting from assembly code generated during execution of the application 108 on the host device 126 to identify objects which communicate with external devices 132 or services while executing on the host device 126. This analysis may reveal one or more security risks associated with execution of the application 108. Identification of security risks may indicate that the application 108 includes features that may lead to data corruption, data destruction, data theft, data leakage, or data intrusion on the host device 126 or on a networked device in communication with the host device 126, such as the external device 132.

A markup language/hybrid testing module 138 may be configured to provide testing functionality associated with markup language applications or hybrid applications.

A test result module 140 may be configured to generate test results 142 based at least in part on information provided by one or more of the host device remote control module 124, the traffic modification module 130, the application validation module 134, the audit module 136, and so forth. The test server API module 120 may be used to provide the test results 142 to the build server 106, the client devices 104, or both. In one implementation, the test results 142 may be expressed using extensible markup language ("XML"), JavaScript Object Notation, or both. For example, a view hierarchy of a user interface associated with the application 108 may be generated during testing. For example, rendering of the user interface of the application 108 may vary based on form factor of the host devices 126, build of the application 108, and so forth. The test result module 140 may be configured to provide test results 142 including view hierarchy information in an XML format for sending to the build server 106 or another device for analysis. In some implementations the test server API module 120 may be configured to allow for interaction elements of the view hierarchy. For example, the user 102 may use an API call to the test server API module 120 to interact with a specific UIView in the view hierarchy.

The build server 106 may receive the test results 142. The build server 106 may provide at least a portion of the test results 142, or information based at least in part on the test results 142, to the client devices 104 for presentation on a user interface. In some implementations the build module 112 may use information in the test results 142 to indicate portions of the application 108 which have passed or failed testing by the test server 116.

The modules of the build server 106, the test server 116, the host devices 126, and so forth are described in this disclosure as separate modules. In some implementations at least a portion of the functionality of these modules may be combined into a single module, or incorporated into another module.

Figure 2:
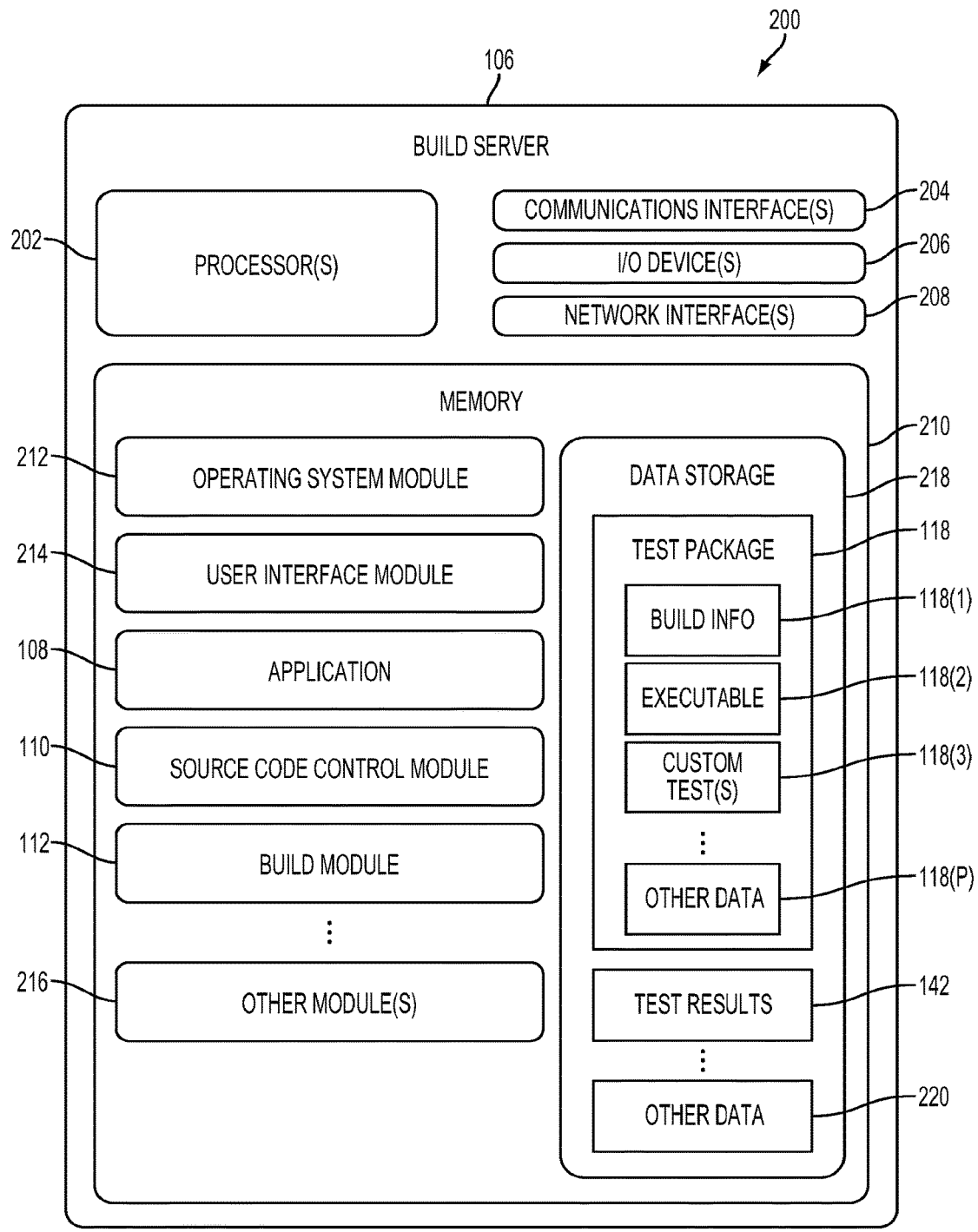
FIG. 2 depicts a block diagram of an example build server configured to facilitate development of the application.

FIG. 2 shows a block diagram 200 of an example build server 106. The build server 106 may include one or more processors 202 configured to execute one or more stored instructions. The processors 202 may include one or more processors, such as a single core processor, multiple cores of a multi-core processor, or one or more respective cores of two or more processors, among other examples.

The build server 106 may include one or more communications interface(s) 204 by which the build server 106 may communicate with other devices. The communications interface(s) 204 may couple to one or more I/O devices 206. In some embodiments, the I/O device(s) 206 may be physically incorporated with the build server 106 or be externally placed.

The build server 106 may also include one or more network interfaces 208 by which the build server 106 may communicate with other networked devices. Such network interface(s) 208 may include one or more network interface controllers (NICs) or other types of transceiver devices configured to send and receive communications over the network(s) 114. For example, the network interface(s) 208 may be configured to provide a Wi-Fi connection compliant with one or more IEEE 802.11® standards such as 802.11g or 802.11n. The build server 106 may also include one or more busses or other internal communications hardware or software that allow for the transfer of data between the various modules and components of the build server 106.

The build server 106 includes one or more memories 210. The memory 210 may include one or more computer-readable storage media ("CRSM"). The CRSM may be any one or more of an electronic storage medium, a magnetic storage medium, an optical storage medium, a quantum storage medium, a mechanical computer storage medium, and so forth. The memory 210 provides storage of computer readable instructions, data structures, program modules, and other data for the operation of the build server 106.

The memory 210 may include at least one operating system (OS) module 212. The OS module 212 may be configured to manage hardware resources such as the communications interface(s) 204 and network interface(s) 208, and to provide various services to applications or modules executing on the processor(s) 202.

The memory 210 may include a user interface module 214, the application 108, the source code control module 110, the build module 112, or other module(s) 216. The user interface module 214 is configured to provide a user interface to the one or more client devices 104. In some implementations the user interface may include a graphical user interface, and may be delivered as hypertext markup language ("HTML") data configured for presentation on the client devices 104.

In some implementations the functionality of the build server 106 may exist across one or more devices. For example, a first build server 106(1) may provide the user interface module 214 while a second build server 106(2) provides the source code control module 110, a third server 106(3) provides the build module 112, and so forth.

The memory 210 may also include data storage 218 to store information for operations of the build server 106. The data storage 218 may include a database, array, structured list, tree, or other data structure. In some implementations, the data storage 218 may store the test package 118 before transmission to the test server 116, the test results 142 received from the test server 116, and so forth.

The test package 118 may include information including build information 118(1), executable files 118(2), custom tests 118(3), or other data 118(P) such as testing configuration data. The build information 118(1) may provide information indicative of libraries used, host devices 126 supported, build version number information, and so forth for a particular application build. For example, the build information 118(1) may indicate that the test package 118 includes build 5.13.1030.1 which is configured for execution on a particular computing device model from manufacturer "A". The executable files 118(2) may include executable binaries, markup language applications, and so forth, which are configured for execution on the host devices 126. The custom tests 118(3) include information indicative of tests, test scripts, designation portions of the application 108 to test, and so forth. For example, the user 102 may generate a custom test 118(3) to exercise particular functionality of the application 108. These custom tests 118(3) may include unit tests configured for use on the host devices 126 in the host device farm 128. The test package 118 may include other data 118(P) such as user identification, account information, and so forth.

Other data 220 may also be stored, such as the API URL associated with the test server 116, historical test results, version information, code check-in/check-out information, build status, and so forth.

Figure 3:
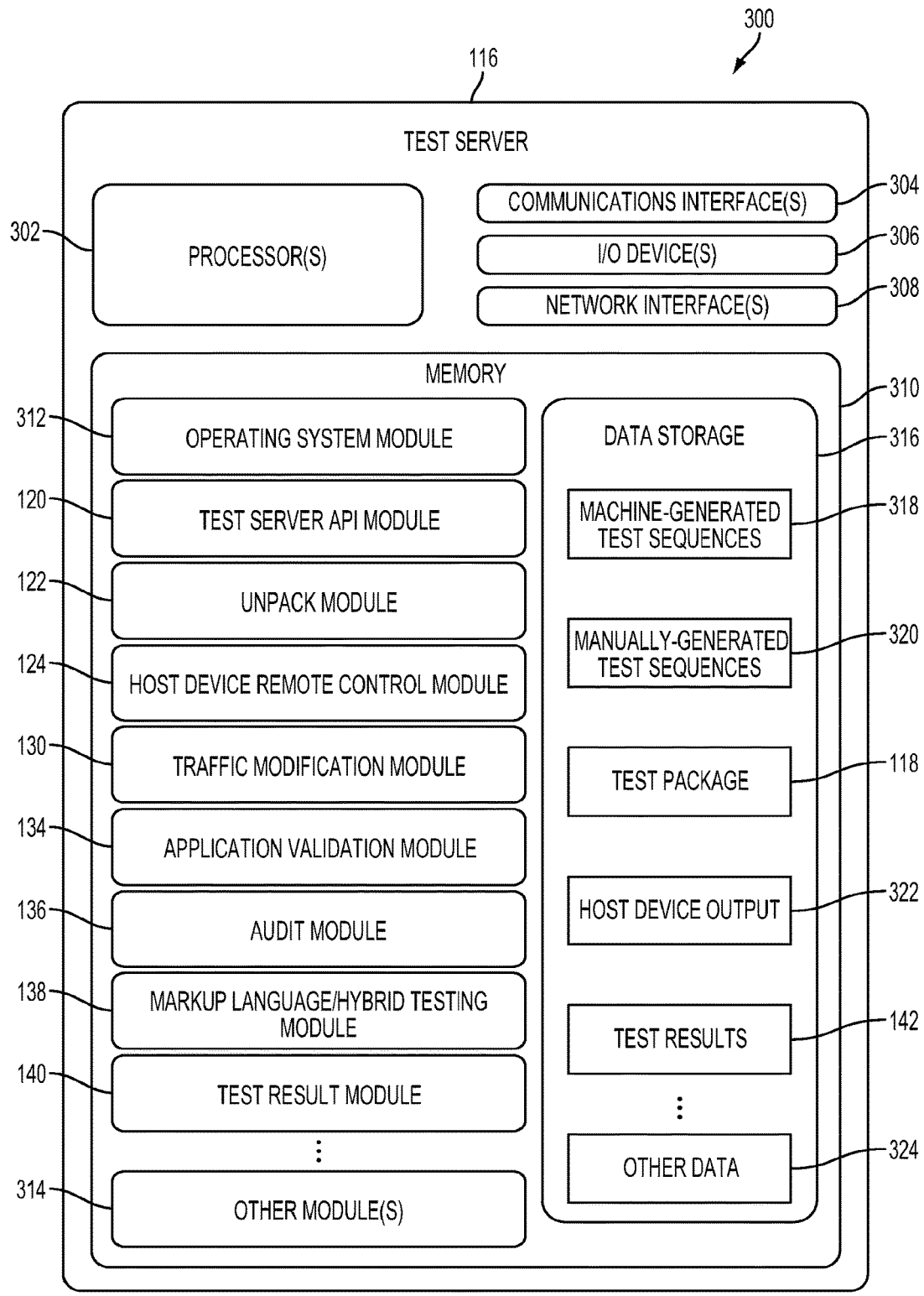
FIG. 3 depicts a block diagram of an example test server configured to test the application on one or more remotely controlled host devices.

FIG. 3 shows a block diagram 300 of the example test server 116. The test server 116 may include one or more processors 302 configured to execute one or more stored instructions. The processors 302 may include one or more processors, such as a single core processor, multiple cores of a multi-core processor, or one or more respective cores of two or more processors, among other examples.

The test server 116 may include one or more communications interface(s) 304 by which the test server 116 may communicate with other devices. For example, the communications interface(s) 304 may be configured to provide a universal serial bus (USB) connection to couple to the host device 126.

The I/O interface(s) 304 may couple to one or more I/O devices 306, such as described above. In some embodiments, the I/O device(s) 306 may be physically incorporated with the test server 116 or be externally placed. s The test server 116 may also include one or more network interfaces 308 by which the test server 116 may communicate with other networked devices such as those depicted in FIG. 1. Such network interface(s) 308 may include one or more NICs or other types of transceiver devices configured to send and receive communications over the network(s). For example, the network interface(s) 308 may be configured to provide a Wi-Fi connection compliant with one or more IEEE 802.11 standards such as 802.11g or 802.11n. The test server 116 may also include one or more busses or other internal communications hardware or software that allow for the transfer of data between the various modules and components of the test server 116.

The test server 116 includes one or more memories 310. The memory 310 may include one or more CRSM as described above. The memory 310 provides storage of computer readable instructions, data structures, program modules, and other data for the operation of the test server 116.

The memory 310 may include at least one OS module 312. The OS module 312 may be configured to manage hardware resources such as the communications interface(s) 304 and network interface(s) 308, and to provide various services to applications or modules executing on the processor(s) 302.

The memory 310 may store one or more of the test server API module 120, the unpack module 122, the host device remote control module 124, the traffic modification module 130, the application validation module 134, the audit module 136, the test result module 140, and so forth.

The test server API module 120 may be configured to accept and respond to the test package 118 or other information sent by the build server 106. The test server API module 120 may also be configured to send the test results 142 or other information to the build server 106. Use of the test server API module 120 allows the build server 106 to integrate the testing functionality of the test server 116 into the automated or semi-automated testing processes associated with the application build.

The unpack module 122 may be configured to unpack the test package 118. The unpacking may include one or more of separating out the application build, tests, configuration data, build information, and so forth. The unpack module 122 may also be configured to verify account information associated with the build server 106 and so forth.

As described above, the host device remote control module 124 is configured to allow the test server 116 to send instructions and data to the host devices 126, receive information from the host devices 126, and so forth. As also described above, the traffic modification module 130 is configured to modify communications between the host devices 126 and one or more external devices 132. The modification may be used to introduce into the testing environment of the application 108 conditions associated with different network conditions such as a particular carrier network, low signal strength, and so forth.

The memory 310 may also include the application validation module 134 configured to validate the object level hierarchy of the application 108 and so forth, as described above. The audit module 136 may be configured to analyze object data resulting from assembly code generated during execution of the application 108 on the host device 126. The analysis may identify objects in the application 108 which communicate with the external devices 132 or services while executing on the host device 126. The markup language/hybrid testing module 138 is configured to provide testing functionality associated with markup language applications or hybrid applications.

The test result module 140 is configured to generate test results 142 based at least in part on information provided by one or more of the host device remote control module 124, the traffic modification module 130, the application validation module 134, the audit module 136, and so forth.

Other modules 314 may also be stored in the memory 310. These may include an account billing module configured to bill for testing services, host device 126 management module for administering the host device farm 128, benchmarking module, service level agreement ("SLA") management module, and so forth.

The benchmarking module may be configured to gather performance benchmarks associated with the application 108. These performance benchmarks may include, but are not limited to load time, responsiveness to inputs, and so forth. The performance benchmarks may be measured across different devices, device configurations, or both which are available in the host device farm 128.

In one implementation, the benchmarking module may be configured to calculate load time metrics for applications 108, web sites, or both. The host devices 126 may be configured with different Internet browsers, layout rendering engines, JavaScript engines, and so forth. The benchmarking module may be configured to measure load time on the host device 126 of pages associated with a particular web site. For example, the load time of a root page of a web site designed for mobile users may be tested. The load time may also be recursively measured for child pages of the web site. Rendering time on the different host devices 126, or on different applications 108 such as Internet browsers on the host devices 126, may also be measured. For example, load times and rendering times for a particular application 108 and web site may be tested across several different Internet browsers for the same host device 126. As with the other modules, the functions of the benchmarking module may be automated, accessed using the test server API module 120, or both.

The SLA management module may be configured to provide a particular level of service as defined by one or more metrics. These metrics may include response times, diversity in host devices 126 used, and so forth. The SLA management module may coordinate and monitor operation of the test server 116 such that test results 142 are provided within a predetermined time. For example, a SLA may specify the test results 142 are to be returned within one hour. The SLA management module may prioritize processing of test packages 118 based on the SLA associated with the test package 118. For example, test packages 118 which have a SLA specifying a one hour response may be prioritized for testing over those test packages 118 with SLAs for eight hour response time.

The memory 310 may also include data storage 316 to store information for operations of the test server 116. The data storage 316 may include a database, array, structured list, tree, or other data structure. The data storage 316 may store machine-generated test sequences 318, manually-generated test sequences 320, or both. The machine-generated test sequences 318 may be generated at least in part by automated processes which execute on the build server 106. For example, the test server 116 may automatically generate the machine-generated test sequences 318 to navigate through all user selectable options in the application 108. In comparison, the manually-generated test sequences 320 may be created by the user 102 or another party. The test sequences are configured to exercise particular functionality, portions of the code, user interface functionality, and so forth. The test sequences may include scripts, code, markup language, and so forth.

The data storage 316 may also include the test package 118 as received from the build server 106 using the test server API module 120. Host device output 322 may also be stored. The host device output 322 may include information received from the host devices 126 in the host device farm 128. The host device output 322 is also discussed below with regard to FIG. 4.

The test results 142 may also be stored in the data storage 316, along with other data 324. The other data 324 may include account information, billing preferences, test configurations, and so forth.

Figure 4:
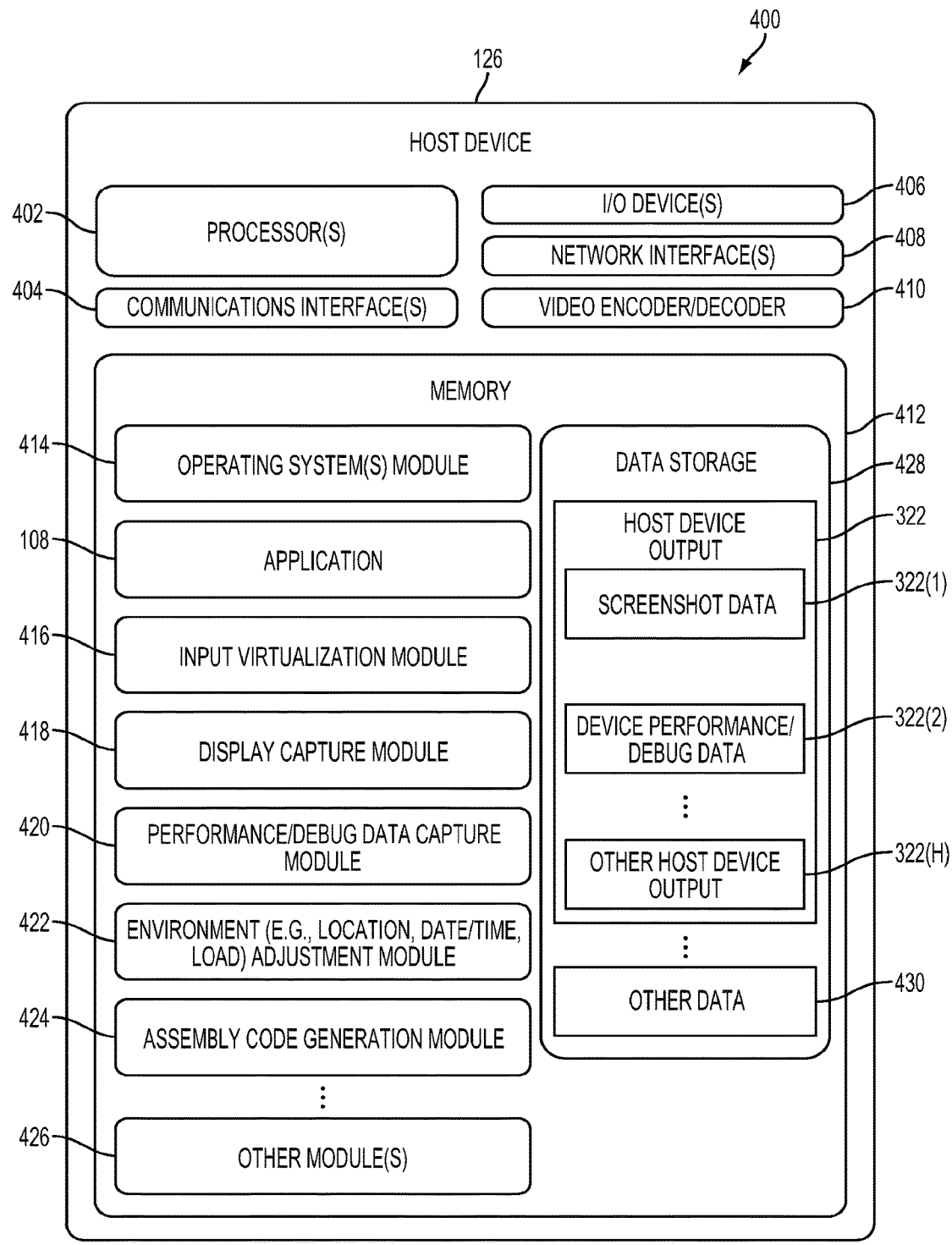
FIG. 4 depicts a block diagram of an example host device remotely controlled by the test server.

FIG. 4 depicts a block diagram 400 of the host device 126. As described above, the host device cloud 128 may be made up of one or more host devices 126 which may be used to test the application 108. A given host device 126 may include one or more processors 402 configured to execute one or more stored instructions. The processors 402 may include one or more processors, such as a single core processor, multiple cores of a multi-core processor, or one or more respective cores of two or more processors, among other examples.

Similar to the devices described above, the host device 126 may include one or more communications interface(s) 404 by which the host device 126 may communicate with other devices. The communications interface 404 may be configured to provide a USB connection.

The communications interface 404 may couple to one or more I/O devices 406. The I/O devices 406 may include user input devices such as one or more of a keyboard, a mouse, a pen, a game controller, a voice input device, a touch input device, gestural input device, and so forth. The I/O devices 406 may include output devices such as one or more of a display, a printer, audio speakers, haptic output device, and so forth. In some embodiments, the I/O devices 406 may be physically incorporated with the host device 126 or be externally placed.

The host device 126 may also include one or more network interfaces 408 configured to send and receive communications over the one or more networks 114. The host device 126 may also include one or more busses or other internal communications hardware or software that allow for the transfer of data between the various modules and components of the host device 126.

The host device 126 may include a hardware-based video encoder/decoder 410. While a hardware-based video encoder/decoder is described, in some implementations a hardware-based video encoder may be used. The video encoder/decoder 410 may be incorporated into a common die with the one or more processors 402 or may be on a separate die. The video encoder/decoder 410 may be configured to enable the capture of screenshot data in the H.264 or MPEG-4 Part 10 compliant format.

The host device 126 includes one or more memories 412. The memory 412 may include one or more CRSM, as described above. The memory 412 may include at least one operating system ("OS") module 414. The OS module 414 may be configured to manage hardware resources such as the I/O interfaces 404 and provide various services to applications or modules executing on the one or more processors 402. The OS module 414 may include mobile operating systems configured for execution on mobile computing devices.

The memory 412 may also include one or more of the application 108, an input virtualization module 416, a display capture module 418, a performance/debug data capture module 420, an environment adjustment module 422, an assembly code generation module 424, or other modules 426.

The application 108 is configured to execute on the host device 126. For example, this may be the application 108 in the test package 118 received from the build server 106.

The input virtualization module 416 is configured to virtually execute input events. These input events may be received as instructions from the host device remote control module 124.

The display capture module 418 is configured to capture screenshots of the host device 126 display and generate screenshot data 322(1). The screenshot data 322(1) may be generated using the hardware-based video encoder/decoder 410. Use of the hardware-based video encoder/decoder 410 allows for the high-fidelity capture and presentation of images presented on the display of the host device 126. This high-fidelity is based on the ability to capture the screenshots at the full resolution and at the full frame rate or redraw rate of the display.

The performance/debug data capture module 420 is configured to capture one or more of: performance data about the host device 126, code-level debug data for apps or other processes running on the host device 126, and so forth. The information may be provided to the build server 106, the user 102, or both.

The environment adjustment module 422 is configured to adjust the host device 126 environment based on input from the test server 116. The environment includes OS, OS version, firmware, firmware version, language in use, date, time, location/position, orientation, and so forth.

The environment adjustment module 422 may modify the location of the host device 126 such that processes running on the host device 126 behave as though the host device were located in a location other than its actual, physical location. For example, the host device 126 may be located in a test facility in San Francisco, Calif., but the OS module 414 of the host device 126 or other applications may report a location of London, England, Paris, France, Beijing, China, or Sydney, Australia, among other examples.

The environment adjustment module 422 may also generate loads on the one or more processors 402, memory 412, I/O devices 406, or a combination thereof. For example, the environment adjustment module 422 may be configured to execute an application 108 which consumes 50% of the processor 402 resources and uses enough memory 412 to result in a low-memory state in the OS module 414. The application 108 may then be executed, and tested under these loaded conditions. In some implementations, the user 102 may use a user interface on the client device 104 to remotely control the host device 126 in real-time to check for responsiveness, behavior, and so forth.

The assembly code generation module 424 is configured to generate assembly code for the application 108 during execution. In some implementations the assembly code generation module 424 may include a debugger.

The other modules 426 may also be included in the host device 126. These other modules 426 may include, but are not limited to, other application modules not under test.

The memory 412 also includes data storage 428 to store information for operations of host device 126. The data storage 428 may include a database, array, structured list, tree, or other data structure. The data storage 428 may store the host device output 322, which may include the screenshot data 322(1) generated by the display capture module 418. The screenshot data 322(1) may be stored until such data is retrieved from the host device 126 by the test server 116 or overwritten by the display capture module 418. The host device output 322 may also include device performance and/or debug data 322(2) gathered by performance/debug data capture module 420. As above, the data 322(2) may be stored until retrieved by the test server 116. Other host device output 322(H) may also be stored. Other data 430 may also be stored in the data storage 428.

Figure 5:
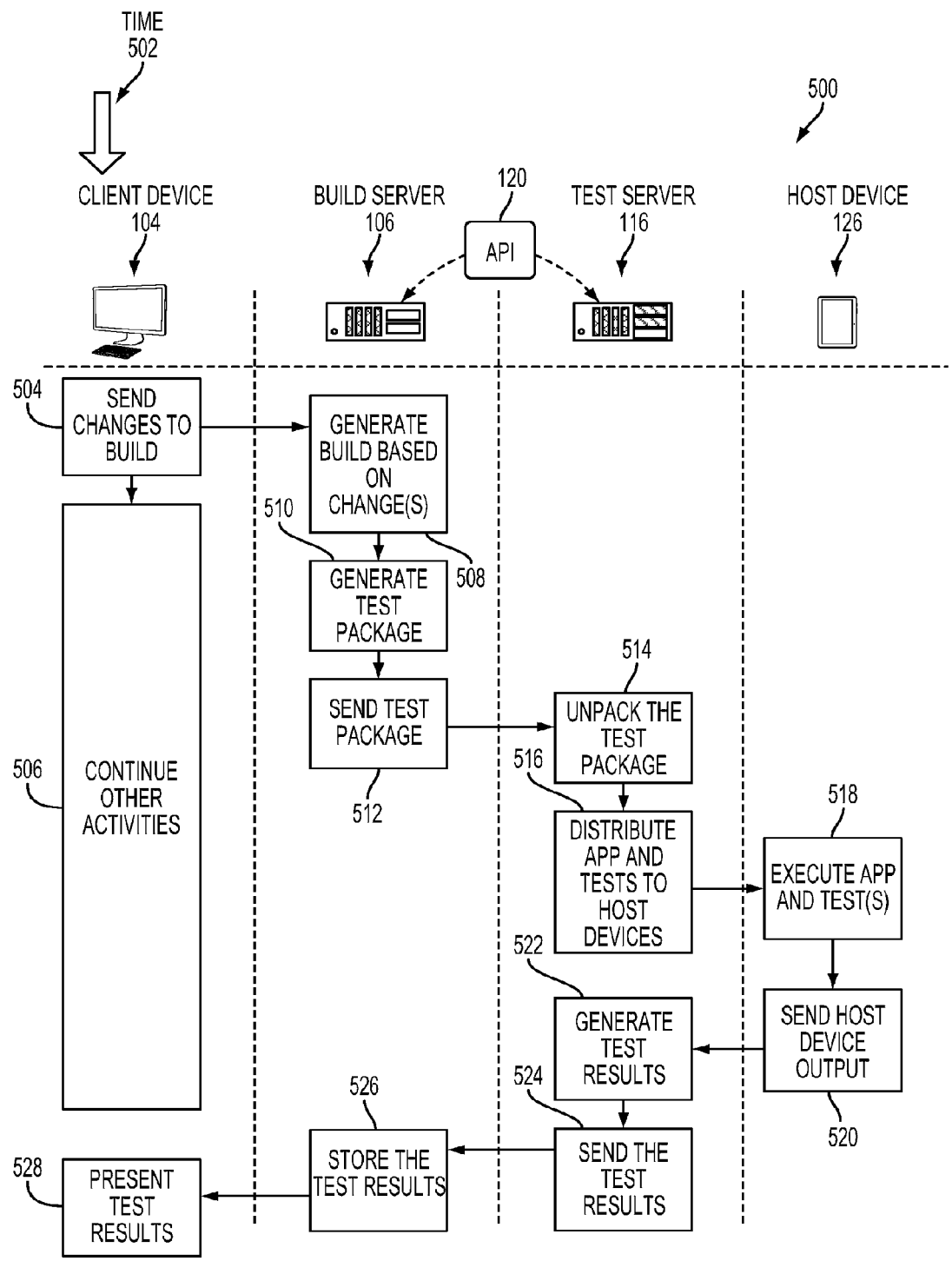
FIG. 5 depicts a block diagram of an example host device remotely controlled by the test server.

FIG. 5 illustrates example operations 500 performed by the various devices in the system 100 in testing the application 108 on the remotely controlled host devices 126 in the host device cloud 128. In this illustration, time increases down the page as indicated by the arrow 502.

The client device 104 may send changes to the application build to the build server 106. For example, some of the source code in the application 108 may have changed during development. Such changes may have been checked-in into the source code control module 110. After sending the changes 504, the client device 104 may continue on with other activities 506. For example, client device may perform various operations to facilitate continued development on the application 108, or perform various operations to facilitate various other tasks, among other examples.

The build server 106 may receive the changes from the client device 104. At 508, the build server 106 generates an application build which may include the changes as checked-in. The application build is configured for execution on one or more of the host devices 126. For example, the application 108 may be configured to execute on a tablet computer from Manufacturer "A". The application build may be for the complete application 108, or for particular modules or portions of the application 108 which are to be tested.

At 510, the build server 106 generates the test package 118. As described above, the test package 118 may include the build information 118(1), one or more executable files 118(2), custom tests 118(3), testing configuration data, and so forth. At 512, the test package 118 is sent to the test server 116. The sending may be facilitated using the test server API module 120. For example, the build server 106 may access the API URL which is unique to the entity operating the build server 106. The build server 106 may send using HTTPS the test package 118 to the test server 116 using the URL associated with the entity.

At 514, the test server 116 unpacks the test package 118. For example, the test server 116 may extract and separate the build information 118(1), the executable files 118(2), and so forth for processing. At 516, the test server 116 distributes the application 108 and associated tests to the host devices 126 in the host device farm 128. In some implementations, the unpacking may be based at least in part on the URL which was used to transfer the test package 118. For example, a particular URL may be associated with tests configured for a particular entity, or group within the entity. As described above, the test server 116 may use the I/O interface 304, such as the USB interface, to exchange information with the host device 126.

At 518 the host device 126 executes the application 108 and associated tests. The execution may include processing instructions from the host device remote control module 124 with the input virtualization module 416 to simulate user input on the host device 126. The execution may also include use the assembly code generation module 424 to produce assembly code associated with the executing application 108. In some embodiments, the assembly code generation module 424 may be a debugger, or may include at least a portion of the functionality of a debugger. However, embodiments are not so limited, and any type of the assembly code generation module 424 may be employed to generate the assembly code data for an application.

At 520, the host device output 322 is sent from the host device 126 to the test server 116. The test server 116 receives the host device output 322 and generates the test results 142 based at least in part on the host device output 322. As described above, the test results 142 may include information expressed as XML, JSON, or both.

At 526, the build server 106 receives and stores the test results 142. The build server 106 may then provide the test results 142, or information based at least in part thereon, to the client device 104 for presentation to the user 102 as shown at 528. For example, the client device 104 may use a web browser application to present at least a portion of the test results 142 to the user 102.

Figure 6:
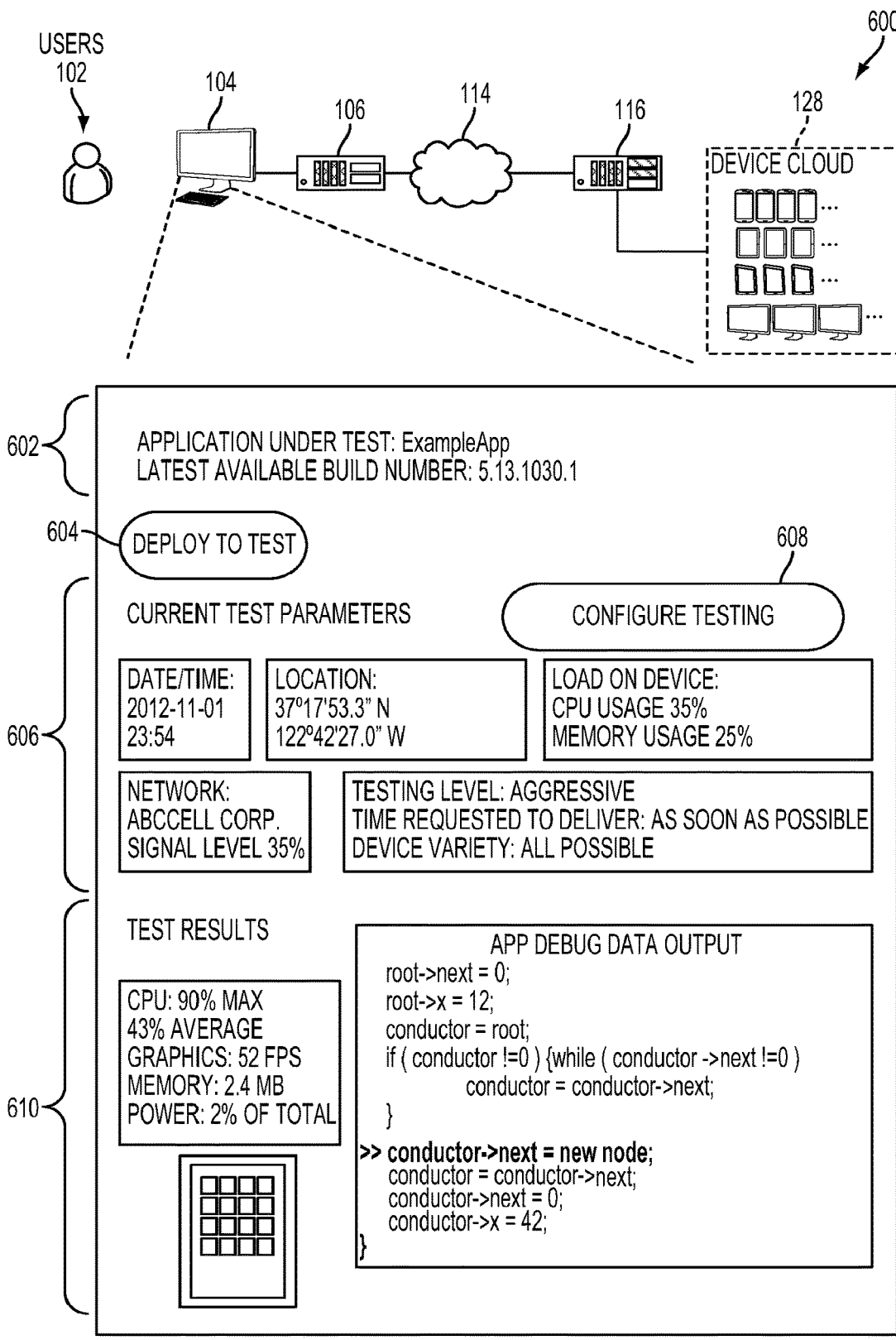
FIG. 6 depicts an example user interface of testing options and results which may be presented to a user.

FIG. 6 shows a user interface 600 of testing options and results which may be presented on a graphical display. The interface 600 may include a web interface suitable for viewing within a web browser running on the client device 104. In some implementations, the data provided by the interface 600 may be copied into a file and reported in the file, in an email, or by way of other means. For example, the object data, the audit result data, the screenshots 322(1), and so forth may be provided to the client device 104. The data provided by the interface 600 may be stored in a file or other data format or structure, and provided in response to a request.

The interface 600 may include a summary section 602, describing characteristics of the application build. For example, as shown here it may indicate the name of the application 108 "ExampleApp" and the current build number "5.13.1030.1".

A deploy-to-test control 604 may be presented. The control 604 may be configured to, on activation, generate and send the test package 118 to the test server 116 for testing. In some implementations the generation and sending of the test package 118 may be initiated automatically, such as at a pre-determined time, upon check-in of all portions of the application 108, upon completion of a process, and so forth.

A current test parameter section 606 provides information about the current configuration of the tests to be completed. For example, the test parameters may specify particular date and time, geographic location, CPU loading and memory usage to be used during testing, and so forth. Information about the network profile parameters to be used by the traffic modification module 130 may also be specified. For example, as shown here the wireless wide area network is set to provide an environment representative of service from "ABCCell Corp." with a signal level as received at the host device 126 of 35%.

The current test parameter section 606 may also provide information such as what tests are to be run, time frame to provide results, how to apply those tests, and so forth. For example, as shown here the testing level is set to "aggressive" in which all available tests will be scheduled to run against the application 108. A requested time to deliver the test results, such as "as soon as possible," "reduced cost," and so forth, may also be specified. For example, the "as soon as possible" may prioritize and conduct tests for the application 108 ahead of other applications which have selected the "reduced cost" option. The "reduced cost" option may thus be offered at a lower cost relative to the "as soon as possible" option given the potential delay in providing the test results 142. Host device 126 variety may also be specified, enabling the application 108 to be tested against all available devices compatible with the application 108, against a certain model, and so forth. This allows for testing to be conducted easily and quickly with several models of the host device 126. For example, the host device cloud 128 may include legacy host devices 126 which are no longer available for purchase, or pre-release models of a next-generation host device 126 to allow for advance testing.

A configure testing control 608 may be presented. The configure testing control 608 is configured to, on activation, provide for modification of one or more of the test parameters. In one implementation, the configure testing control 608 may present a user interface allowing change of test parameters. For example, options to enable debug options which provide details on UTView may be selected.

A test results section 610 provides information based at least in part on the test results 142 as received from the test server 116. The information may include screenshot data 322(1), device performance/debut data 322(2), and so forth. For example, a graphical display may present a stream of video taken during a portion of the testing of the application on the one or more host devices 126 to show behavior during testing. Other information such as UIView details, a portion of a UI layout hierarchy dump, application load times, web site load times, and so forth may also be presented.

The output of the test results 142 may be configurable to meet the specific requirements indicated by a user profile, such as a user profile of users 102. For example, one user profile may indicate that reports are to be delivered as XML, data while another user profile may indicate that reports are to be delivered as JSON data.

Figure 7:
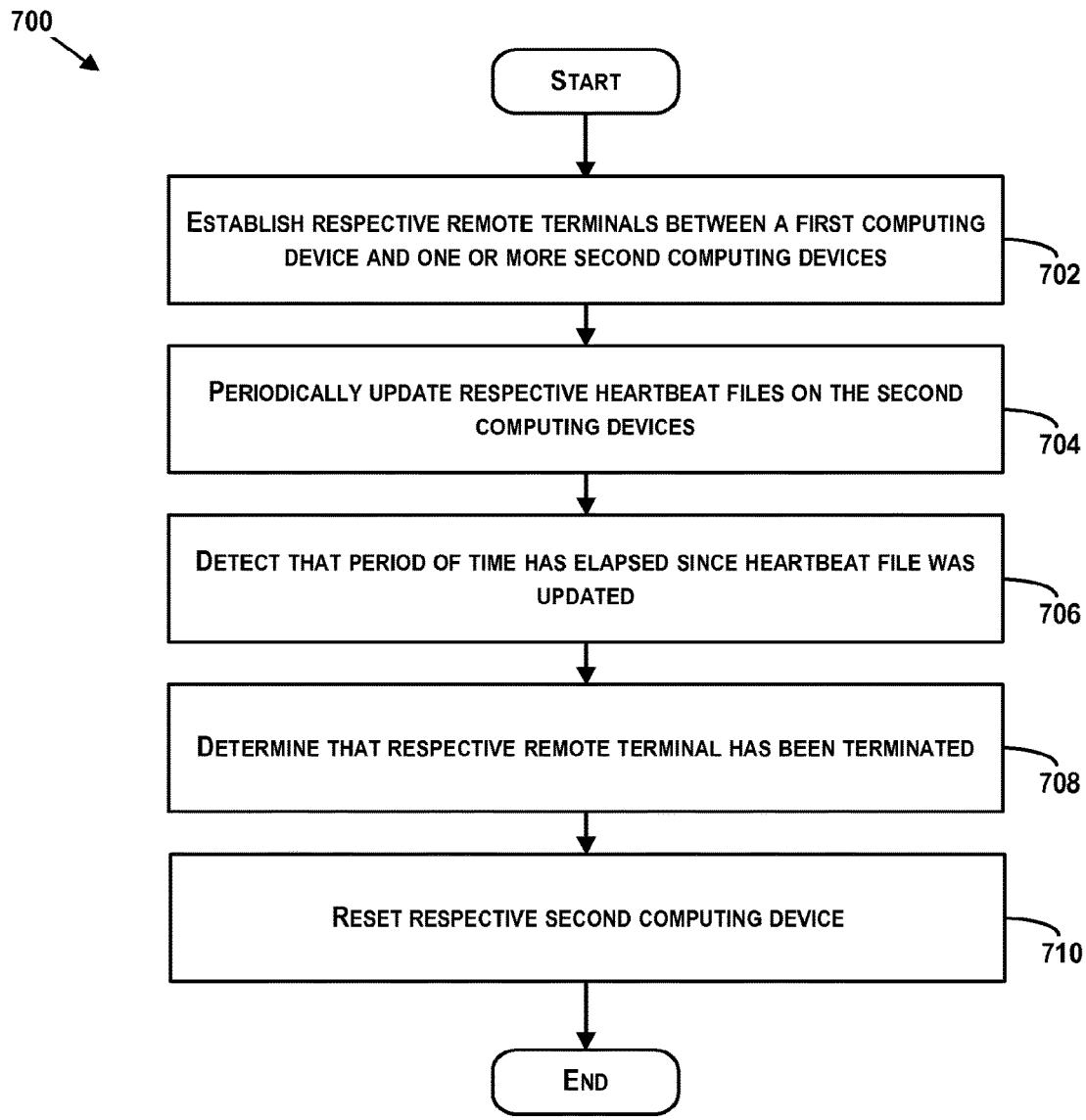
FIG. 7 is a flow diagram illustrating an example method to facilitate maintenance of a device cloud.
Figure 8:
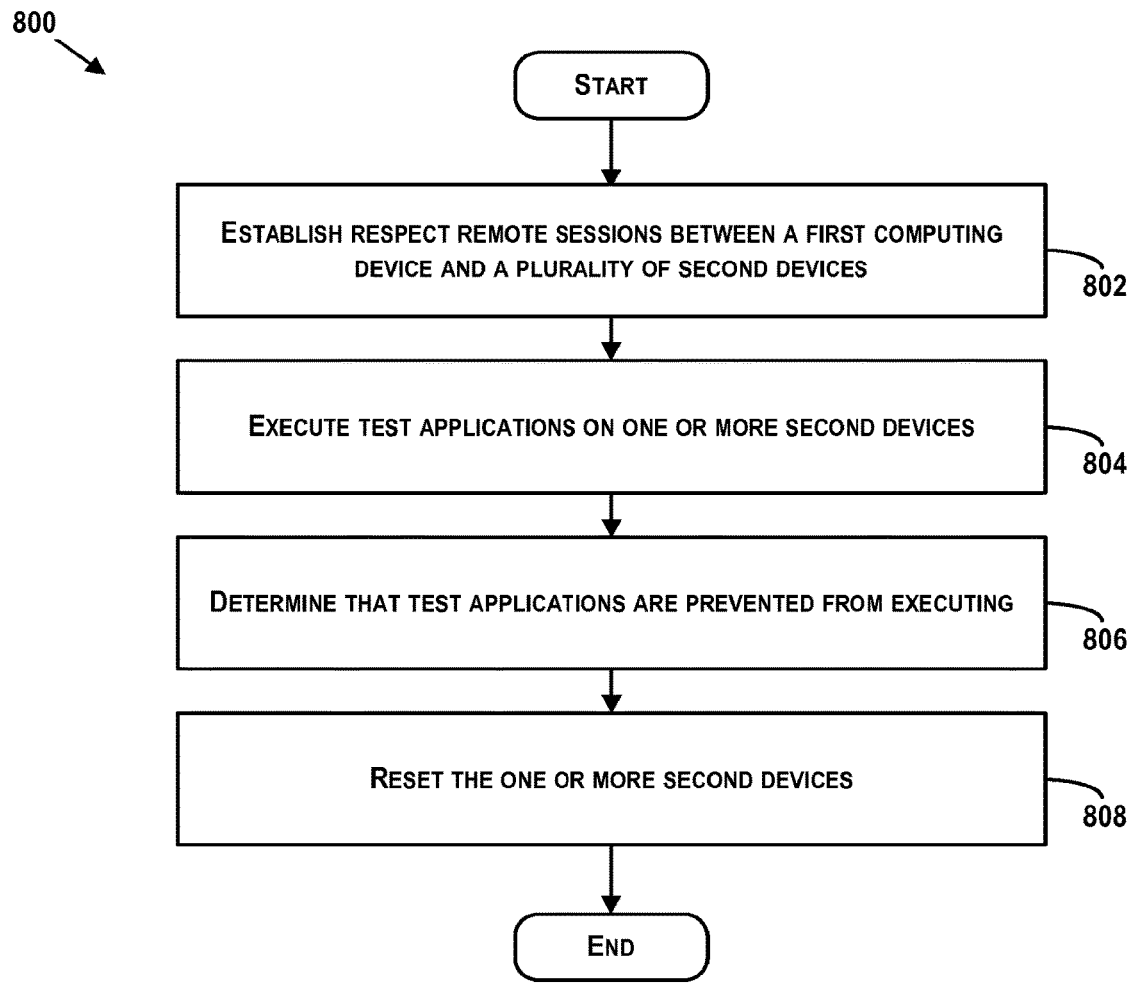
FIG. 8 is a flow diagram illustrating another example method to facilitate maintenance of a device cloud.

FIG. 7 and FIG. 8 are block diagrams of an example methods 700 and 800, respectively, to facilitate maintenance of a device cloud, in accordance with at least some embodiments described herein. Methods 700 and 800 shown in FIGS. 7 and 8 present embodiments of methods that, for example, could be used with a system, such as the example system 100 for testing of applications on remote host devices, among other examples. Methods 700 and 800 may include one or more operations, functions, or actions as illustrated by one or more blocks of 702-710 and 802-808, respectively. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the methods 700 and 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the methods 700 and 800 and other processes and methods disclosed herein, each block in FIGS. 7 and 8 may represent circuitry that is wired to perform the specific logical functions in the process.

Functions of the methods 700 and 800 may be fully performed by a processor of a computing system, or may be distributed across multiple components of a computing device. For example, such function might be performed by a test server 116 of FIG. 1, or perhaps by a host device of device cloud 128, such as host device 126. In some examples, the functions of methods 700 and 800 may be distributed across multiple computing devices and/or a server.

FIG. 7 is a flow diagram of an example method 700 that may facilitate maintenance of device cloud. At block 702, the method 700 may involve establishing respective remote terminals between a first computing device and one or more second computing devices of the plurality of second computing devices. For instance, test server 116 of FIG. 1 may establish respective remote terminals with one or more devices of the device cloud 128, such as host device 126.

A given remote terminal may involve a particular type of connection between the first computing device and a second computing device by which the first computing device may perform operations with respect to the second computing device. Such operations may include executing instructions on the second computing device or modifying files on the second computing device. As an example, test server 116 and host device 126 may include a terminal server and a terminal service (e.g., a terminal daemon that executes as a background service on host device 126), respectively. In such an example, establishing a remote terminal may involve connecting the terminal server with the terminal service. The test server 116 may execute instructions by way of the connection between the terminal server and the terminal service. Such instructions may cause host device 126 to perform various operations, such as executing builds of test packages according to instructions in the test package or perhaps executing one or more applications or services configured to observe the test packages, among other examples.

The operation of establishing the remote terminals between a first computing device and one or more second computing devices of the plurality of second computing devices may indicate that the one or more second devices are in the online state. Establishing a remote terminal with a given second device may indicates that the second device in the online state because the first computing device uses remote terminals to perform application tests. In some example systems, an established remote terminal may be considered a necessary, but not necessarily sufficient, condition to perform application tests. In such examples, by establishing a remote terminal between, for example, test server 116 and host device 126, test server 116 may assume that host device 126 is in the online state. However, such an assumption may change if other conditions are detected which indicate that host device 126 is in the offline state. Conversely, if test server 116 is unable to establish a remote terminal, test server 116 may assume that host device 126 is in an offline state in which application tests are unable to be performed. After establishing a remote terminal, test server 116 may consider host device 126 as part of a pool of online devices that are available for performing application tests.

In FIG. 7, at block 704, the method may involve updating, via the respective remote terminals, respective heartbeat files on the second computing devices. A given heartbeat file may be any suitable file that indicates a time at which the heartbeat file was last updated, perhaps by way of a timestamp or other indication of the time at which the heartbeat file was last updated.

In some examples, barring an interruption in the remote terminal, or another other issue, the respective heartbeat files are updated periodically. The period between updates of a given heartbeat file may vary by implementation. An example period is 30 seconds.

As an example, a remote terminal may provide the test server 116 access to a file system (or a portion thereof, such as one or more particular directories of the file system). By way of such file system access, test server 116 may modify files on host device 126. For instance, test server 116 may update respective heartbeat files on one or more host devices of device cloud 128 via respective remote terminals between test server 116 and the one or more host devices of device cloud 128. For instance, test server 116 may modify data of a heartbeat file stored on host device 126. In some implementations, such a modification may cause a last modified timestamp in metadata associated with the heartbeat file to be updated. Alternatively, test server 116 might write a timestamp or other indication of the present time to the heartbeat file, thereby creating a record of the last update time.

In FIG. 7, at block 706, the method may involve detecting that a pre-determined period of time has elapsed since the respective heartbeat file was updated. For instance, host device 126 may check a timestamp on the heartbeat file of host device 126 for the time at which the heartbeat file was last updated and compare it against a timestamp indicating the present time to determine the period of time that has elapsed since the heartbeat file was updated. In some cases, the host device 126 may detect that the period of time that has elapsed since the heartbeat file was updated is longer than the pre-determined period of time. The pre-determined period of time may be proportional to the period that the heartbeat file is updated, such as every 30 seconds. Other examples periods of time may include periods of time ranging, for example, from 5 seconds to 300 seconds. Such a determination may indicate an issue in the operation of the system 100 that is preventing test server 116 from updating the heartbeat file on host device 126.

Also in FIG. 7, at block 708, the method may involve determining that a respective remote terminal between the first computing device and a respective second computing device has been terminated. Determining that the respective remote terminal has been terminated may indicate that the respective second computing device is in the offline state in which application tests are unable to be performed via the respective remote terminal, as the first computing device might be unable to perform application tests by way of the remote terminal.

As one example, based on detecting that the pre-determined period of time has elapsed since the respective heartbeat file was updated, host device 126 may determine that a remote terminal between test server 116 and host device 126 has been terminated. Since test server 116 is configured to periodically update the heartbeat file of host device 126 via the remote terminal between test server 116 and host device 126, host device 126 may assume that the remote terminal has been terminated if the heartbeat file is not updated periodically.

Various issues may cause the remote terminal to be terminated. For instance, an example test package may include a build having one or more coding errors (also known as software bugs). In operation, test server 116 may initiate an application test of that example test package on host device 126, which may involve executing the test package. In some cases, executing the test package with the coding errors may cause various issues with respect to host device 126, some of which may terminate the remote terminal, among other possible issues.

In FIG. 7, at block 710, the method may further involve resetting the respective second computing device so as to transition the respective second computing device from the offline state to the online state. For instance, host device 126 may reset itself so as to "self-heal" by transitioning from the offline to the online state. In circumstances where the remote terminal is terminated, the test server 116 might be unable to reset or otherwise transition the host device 126 to the online state, as the remote terminal is unavailable for the test server 116 to execute instructions that may cause the host device 126 to transition to the online state. By self-healing from the offline state, the devices of the device cloud 128, such as host device 126, may increase the amount of "up-time" (i.e., time that a respective device is in the online state in which application tests are able to be performed on the device). In aggregate, devices of device cloud 128 may respectively "self-heal" and may thereby improve the "up-time" of the device cloud as a whole.

In some examples, resetting the respective second computing device may involve restarting the second computing device. Restarting a device, such as host device 126, may have various effects on the device. For instance, restarting a device may release system resources in use by various applications, such as initiated application tests. An initiated application test may use system resources in performing various operations, such as executing a build of a test packages, or executing applications configured to observe the executing build, among other examples). Such resources may include processor cycles (e.g., cycles of processors 402 in FIG. 4), memory (e.g., memory 412), data storage (e.g., data storage 428), or hardware components (e.g., communications interfaces 404 or network interfaces 408). Restarting the device may also return one or more components or modules to a default or initial state, which may correct issues caused by the executing test packages, thereby transitioning the device to the online state.

As noted above, additional conditions may indicate whether a given second device is in an online or offline state. For instance, in some examples, ability for a given second device to install or uninstall applications (e.g., a build of a test package) may indicate that the device is in the online state. Conversely, inability to install or uninstall applications may indicate that the device is in the offline state. To test this condition, a given second computing device (e.g., host device 126) may periodically initiate installation of an application. The second computing device may then determine whether the application installed or failed to install. In some cases, the application may fail to install and, accordingly, the second computing device may determine that the respective application failed to install.

A determination that the respective application failed to install indicates that the second computing device is in the offline state. Based on such a determination, the second computing device may reset so as to transition to the online state. In another example, the first computing device (e.g., test server 116) may periodically initiate installation of an application on one or more second computing devices and determine whether the application installed or failed to install, perhaps by querying respective lists or databases of applications that are installed on each of the one or more second devices.

In some instances, an ability for a given second device to execute applications (e.g., testing packages) may indicate that the device is in the online state. Some devices may prevent some applications from executing, perhaps in an attempt to improve security or stability of the device. However, such features may also prevent tests of such applications from being performed.

To test an ability to execute applications, a given second computing device (e.g., host device 126) may periodically execute an application. The second computing device may then determine whether the application executed or failed to execute. In some cases, the application may fail to execute and the second computing device may determine that the respective application failed to execute. Determining that the respective application failed to execute indicates that the second computing device is in the offline state. Based on such a determination, the second computing device may reset so as to transition to the online state. In another example, the first computing device (e.g., test server 116) may periodically initiate execute an application on one or more second computing devices and determine whether the application installed or failed to install, perhaps by querying respective lists of executing applications on each of the one or more second devices.

Some types of devices are battery-powered and include one or more batteries. In some cases, the one or more second devices may include battery-powered devices. For example, the device cloud 128 may include one or more battery-powered devices. In some cases, the batteries of such battery-powered devices may charge by way of respective communications interfaces between the battery-powered devices of the device cloud 128 and the test server 116, such as via respective USB interfaces that transmit power and data. Given a battery-powered device, another condition that may affect the ability to perform application tests on the battery-powered device is the battery level. A low battery level may indicate that a given device is in the offline state.

To test whether a low battery level is bringing a given second device offline, the second device may periodically detect a battery level its battery. In some cases, the second computing device may determine that the detected battery level is below a threshold level and, based on that determination, determine that the second computing device is in the offline state. While in some cases the battery level might be sufficient to perform some applications tests, the system may treat devices having respective battery levels that are below the threshold level as being in the offline state. This may avoid some issues, such as an application test being interrupted, or perhaps an application test getting inaccurate results because of a low battery level. The second computing device may perform one or more operations to transition the device to the online state, such as resetting the device, or sending a message or alert indicating a low battery status of the device.

Another condition related to battery-powered devices that may affect that may affect the ability to perform application tests on a given battery-powered device is the temperature of the battery. A high battery temperature may damage the device or cause swelling that interferes with the operation of the device. In some examples, a first computing device may periodically detect respective temperatures of respective batteries on one or more second devices. In some cases, the first computing device may determine that the detected respective temperatures of the respective batteries are above a threshold temperature level (e.g., 40 degrees Celsius) and, based on such a determination, determine that those devices are in the offline state. In other examples, a given second computing device may periodically detect a temperature of a battery of the second computing device and determine that the computing device is in the offline state based on the temperature of the battery exceeding the threshold temperature level. The threshold battery temperature may vary based on the battery characteristics, such as the material composition, size, power draw, and/or operating voltages Another condition related to battery-powered devices that may affect that may affect the ability to perform application tests on a given battery-powered device is a low charging current. Charging some devices may involve providing more power to maintain battery level than a given charger is capable of providing. For instance, a tablet computing may draw relatively higher current when charging than a smartphone as the tablet computer has a relatively larger battery. A device cloud may include a variety of chargers capable of providing different current levels. Chargers that can provide relatively lower current levels may be chosen in some circumstances for relatively lower cost and, in some cases, such a charger may be connected to a device that draws more current in charging than the charger can provide.

When a charger is unable to provide sufficient current to a given second computing device to charge a battery, the battery level may slowly drain, or the battery may to fail to fully charge. In some examples, a first computing device may periodically detect respective currents into respective batteries of one or more second devices. In some cases, the first computing device may determine that the detected respective currents are below a threshold current level and, based on such a determination, determine that those devices are in the offline state. In other examples, a given second computing device may periodically detect a current into a battery of the second computing device and determine that the computing device is in the offline state based on the current into the battery being below a threshold current level. The threshold current level may vary based on the battery characteristics, such as the material composition, size, power draw, and operating voltages.

Some application tests may involve communication by way of a wireless communication interface. For instance, testing certain builds may involve wireless communication to validate the test packages. In such cases, an inability for a given second computing device to communicate via the wireless communication interface may indicate that the second computing device is in the offline state. To test such a condition, a given second computing device may send, to at least one host via a wireless communication interface of the second computing device, an echo request message that requests a response from the at least one host. The at least one host might be one or more of: a destination server, a default gateway, or a Domain Name Server (DNS), among other examples.

In some cases, the second computing system may determine that the requested response from the at least one host failed to arrive at the wireless communication interface of the second computing device. For instance, host device 126 may send an echo request message to a host, wait a pre-determined period of time, and then determine that the requested response from the host failed to arrive at the wireless communication interface of host device 126 within the pre-determined period of time. Such a determination may indicate that host device 126 is in the offline state. To transition to the online state, host device 126 may reset its wireless communication interface. Alternatively, host device 126 may reset itself, thereby resetting the wireless communication interface and possibly other components as well.

Some device clouds may include a large number of co-located host devices (e.g., greater than 15,000 devices). Respective wireless communication interfaces on such a large number of host devices may cause considerable wireless interference. In some cases, wireless interfere may interfere with the an application test or with a test of a given wireless communication interface, perhaps producing a false positive that incorrectly indicates that a device is in an offline state by virtue of the condition of its wireless communication interface. In some cases, in an attempt to avoid such interference, the system may idle a portion of the devices at any point in time such that the respective wireless communication interfaces of the devices are not transmitting.

During execution, some test packages may get into states in which they use a disproportionate share of system resources. For instance, a memory leak may cause a test package to use an increasing amount of memory during execution. As another example, a bug may cause a test package to use a relatively high percentage of available processing power (e.g., ~100%). Such conditions may cause a given second computing device to transition into the offline state.

In some examples, a given second computing device may periodically detect system resources that an initiated application test is using. Such system resources may include processing power, memory, or other hardware resources. In some cases, the second computing device may determine that the initiated application test is using more than a threshold percentage of system resources of the respective second computing device. The second computing device may terminate the initiated application test so as to release the system resources that the initiated application test is using. Releasing the system resources may prevent the second computing device from going offline, which may increase up-time of the device. In other cases, the first computing device may periodically detect system resources that an initiated application test is using and terminate the initiated application test based on determining that the initiated application test is using more than a threshold percentage of system resources.

The threshold percentage may vary based on the capabilities of the device. For instance, system 100 of FIG. 1 may maintain or have access to a database or other data structure containing data representing available system resources of devices in the device cloud 128. In some examples, the test server 116 (or perhaps a host device, such as host device 126) may refer to the database to set the threshold for a given host device. For example, host device 126 may have 2 gigabytes of memory, and the threshold may be set at 500 megabytes (or 25%) of the available memory.

In some cases, one or more services may be involved in performing application tests. Some examples of such services include services that are involved in observing a test package during a test of that test package. Other examples may include a gatekeeper service that provide handles to other services, perhaps the services that are involved in observing a test package during a test of that test package. In some cases, these services may stop running or otherwise get into a state in which they are unable to be used in performing application tests on a given second computing device, which may indicate that the second computing device is in the offline state.

In some examples, a second computing device may request, from gatekeeper services of the second device, respective handles to one or more respective services of the second computing device. A given handle may include a reference to a particular service. The second computing device may access the particular service by way of the handle. In some cases, a gatekeeper service may get into a state in which the gatekeeper service is denying requests for handles to services. If a second computing device, such as host device 126, is unable to get a handle to particular services involved in performing an application test, the second computing device may be unable to perform application tests and may be considered to be in the offline state.

In some implementations, the first computing device may detect respective states of one or more gatekeeper modules of respective second computing devices. In some cases, the first computing device may determine that the respective gatekeeper services are in a state in which the respective gatekeeper services are deny requests for handles, and, based on such a determination, reset the second computing devices to transition the device from offline to online. In other cases, a given second computing device, ma determine that the a gatekeeper service of the second device is in a state in which the gatekeeper service is denying requests for handles, and, based on such a determination, transition the device from offline to online.

As noted above, one or more services may be invoked during an application test. In some cases, such services may terminate and thus be unavailable for performing application tests. In some examples, a given second computing device may detect respective execution states of one or more services of the second computing device. Such execution states may include running or terminated, among other possibilities. In some cases, the second computing device may determine that at least one service has terminated execution, which may indicates that the second computing device is offline, as the second computing device may be unable to invoke the service to perform an application test while the service is terminated. Based on such a determination, the second computing device may reset itself to transition to the online state. In other cases, the first computing device may periodically detect execution states of one or more second computing devices, and reset some second computing devices based on determining that at least one respective service on the second computing devices has terminated execution.

In some cases, one or more popups may be initiated on a given second computing device. Some example popups may be initiated by a test package, as some applications may implement popups as features of the application. Other example popups may be initiated by an operating system of the computing device. For instance, some operating systems initiate a popup requesting that a given host device be trusted with the test server to which it is connected. For instance, an operating system (or other application) on host device 126 may produce a popup requesting that test server 116 be trusted with host device 126.

Popups may interrupt or otherwise interfere with performing an application test. Moreover, manually advancing through popups on a device cloud containing a large number of host devices may be unduly time-consuming or expensive. In some examples, a given second computing device may periodically detect popups that have been initiated and clear the one or more popups so as to permit application tests to continue on the second computing device. In other cases, the first computing device may detect one or more respective popups being initiated on one or more second computing devices and clear those one or more respective popups to permit respective application tests to continue on the one or more second computing devices.

Referring now to FIG. 8, FIG. 8 is a flow diagram of another example method 700 that may facilitate maintenance of device cloud. At block 702, the method 800 involves establishing respective remote sessions between the first computing device and a plurality of second devices. For instance, test server 116 of FIG. 1 may establish remote sessions with a plurality of host devices of device cloud 128, such as host device 126. An example remote session may include a type of connection between test server 116 and host device 126 by which test server 116 may transmit commands and test packages to host device 126. Host device 126 may receive such commands and execute instructions to carry out the commands. Examples commands may include executing application or invoking services. Establishing such a remote session with a given host device may indicate that the host device is online, as test server 116 may send commands and test packages to the host device.

At block 804, method 800 may involve executing respective test application on one or more second computing devices. For instance, test server 116 may execute, via the established respective remote terminals, respective test applications on one or more host devices of device cloud 128, such as host device 126.

At block 806, method 800 may involve determining that respective modules of the one or more second computing devices are preventing the respective test applications from executing. For instance, the one or more host devices of device cloud 128 may include respective operating systems that include respective modules. Such a module may prevent certain applications from executing, if the module detects that the application is causing issues. Such issues may include using a disproportionate share of system resources, attempting to access data storage allocated to other applications, or causing services of the host device to terminate, among other examples. These modules may, in some cases, improve security or stability of a host device.

However, in some cases, the module may prevent a test application from executing, thereby preventing the host device from performing an application test of the test application. In such cases, the host device may be considered to be in the offline state in which application tests are unable to be performed.

At block 808, method 800 may involve resetting the one or more second computing devices so as to transition the one or more second computing devices from the offline state to the online state. Resetting a given host device, such as host device 126, may reset the module that is preventing test applications from executing on the host device such that after the reset, the module might allow the test applications to execute.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system comprising:
a first computing device connected over respective communications interfaces to a plurality of second computing devices, the first computing device including one or more processors configured to execute stored instructions to perform functions including:
establish, over the respective communications interfaces, respective remote terminals between the first computing device and one or more second computing devices of the plurality of second computing devices, wherein establishing the respective remote terminals indicates that the one or more second computing devices are in an online state in which application tests are able to be performed via the respective remote terminals; and
the one or more second computing devices including one or more processors configured to execute stored instructions to perform functions including:
periodically detect system resources that a respective initiated application test is using;
based on the detected system resources, determine that the respective initiated application test is using more than a threshold percentage of system resources of the respective second computing device; and
based on determining that the respective initiated application test is using more than a threshold percentage of system resources, terminating the respective initiated application test so as to release the system resources that the respective initiated application test is using.

2. The system of claim 1, wherein establishing the respective remote terminals between the first computing device and the one or more second computing devices comprises connecting a terminal server of the first computing device with respective terminal daemons of the second computing devices, and wherein resetting the respective second computing device comprises restarting the terminal daemon of the respective second computing device.

3. The system of claim 1, wherein the one or more second computing devices are further configured to:
periodically initiate installation of a respective application on a respective second computing device;
after initiating installation of the respective application, determine that the respective application failed to install, wherein determining that the respective application failed to install indicates that the respective second computing device is in an offline state in which application tests are unable to be performed via the respective remote terminals; and
based on determining that the respective application failed to install, reset the respective second computing device so as to transition the respective second computing device from the offline state to the online state.

4. The system of claim 1, wherein the one or more second devices are further configured to:

periodically execute a respective application on a respective second computing device;

after executing the respective application, determine that the respective application failed to execute, wherein determining that the respective application failed to execute indicates that the respective second computing device is in an offline state in which application tests are unable to be performed via the respective remote terminals; and based on determining that the respective application failed to install, reset the respective second computing device so as to transition the respective second computing device from the offline state to the online state.

5. The system of claim 1, wherein the one or more second devices comprise respective wireless communications interfaces, and wherein the one or more second devices are further configured to:

send, by a respective second computing device to a host via a respective wireless communication interface, an echo request message that requests a response from the host;

determine that the requested response from the host failed to arrive at the respective wireless communication interface within a pre-determined period of time, wherein determining that that the requested response from the host failed to arrive at the respective wireless communication interface indicates that the respective second computing device is in an offline state in which application tests are unable to be performed via the respective remote terminals; and reset the respective wireless communication interface so as to transition the respective second computing device from the offline state to the online state.

6. The system of claim 1, wherein the communications interfaces comprise respective universal serial bus interfaces.

7. A system comprising:

a first computing device connected over respective communications interfaces to a plurality of second computing devices, the first computing device including one or more processors configured to execute stored instructions to perform functions including:

establish, over the respective communications interfaces, respective remote terminals between the first computing device and one or more second computing devices of the plurality of second computing devices, wherein establishing the respective remote terminals indicates that the one or more second computing devices are in an online state in which application tests are able to be performed via the respective remote terminals; and the one or more second computing devices including one or more processors configured to execute stored instructions to perform functions including:

periodically detect a battery level of a battery of a respective second computing device; and after detecting the battery level, determine that the battery level is below a threshold battery level;

based on determining that the battery level is below the threshold battery level, determine that the respective second computing device is in an offline state in which application tests are unable to be performed via the respective remote terminal; and send a message to the first computing device indicating that the respective second computing device is in the offline state.

8. The system of claim 7, wherein the one or more second computing devices comprise respective batteries, and wherein the one or more second computing devices are further configured to:

periodically detect respective currents into the respective batteries;

determine that the detected respective currents into the respective batteries are below a threshold current level; and based on determining that the detected respective currents into the respective batteries are below the threshold current level, determine that the one or more second computing devices are in the offline state in which application tests are unable to be performed via the respective remote terminals.

9. The system of claim 7, wherein the one or more second computing devices are further configured to:

periodically initiate installation of respective applications on the one or more second computing devices;

after initiating installation of the respective applications, determine that the respective applications failed to install, wherein determining that the respective application failed to install indicates that the one or more second computing devices are in the offline state in which application tests are unable to be performed via the respective remote terminals; and based on determining that the respective applications failed to install, reset the one or more second computing devices so as to transition the one or more second computing devices from the offline state to the online state.

10. The system of claim 7, wherein the one or more second computing devices are further configured to:

initiate, via the respective remote terminals, respective application tests on the one or more second computing devices.

11. The system of claim 10, wherein the one or more second computing devices are further configured to:

detect one or more respective popups being initiated on the one or more second computing devices, wherein the one or more respective popups are interrupting the respective application tests on the one or more second computing devices; and clear the one or more popups on the one or more second computing devices so as to continue the respective application tests on the one or more second computing devices.

12. The system of claim 10, wherein the one or more second computing devices are further configured to:

periodically detect system resources that the respective initiated application test is using;

determine that the respective initiated application tests are using more than a threshold percentage of system resources of the respective second computing devices; and based on determining that the respective initiated application tests are using more than the threshold percentage of system resources, terminate the respective initiated application test so as to release the system resources that respective initiated application test is using.

13. The system of claim 7, wherein the one or more second computing devices are further configured to:

periodically detect respective execution states of one or more respective services of the one or more second computing devices, wherein the initiating the respective application tests comprises invoking the one or more respective services;

based on the detected respective execution states, determine that the one or more respective services have terminated execution, wherein determining that the one or more respective services have terminated execution indicates that the one or more second computing devices are in the offline state in which application tests are unable to be performed via the respective remote sessions; and based on determining that the one or more respective services have terminated execution, reset the one or more second computing devices so as to transition the one or more second computing devices from the offline state to the online state.

14. A system comprising:

a first computing device connected over respective communications interfaces to a plurality of second computing devices, the first computing device including one or more processors configured to execute stored instructions to perform functions including:
  establish, over the respective communications interfaces, respective remote terminals between the first computing device and one or more second computing devices of the plurality of second computing devices, wherein establishing the respective remote terminals indicates that the one or more second computing devices are in an online state in which application tests are able to be performed via the respective remote terminals; and the one or more second computing devices comprising respective batteries, and the one or more second computing devices including one or more processors configured to execute stored instructions to perform functions including:
  periodically detecting respective temperatures of the respective batteries;
  determining that the detected respective temperatures of the respective batteries are above a threshold temperature level; and
  based on determining that the detected respective temperatures of the respective batteries are above the threshold temperature level, determining that the one or more second computing devices are in an offline state in which application tests are unable to be performed via the respective remote terminals.

15. The system of claim 14, wherein establishing the respective remote terminals between the first computing device and the one or more second computing devices comprises connecting a terminal server of the first computing device with respective terminal daemons of the second computing devices, and wherein resetting the respective second computing device comprises restarting the terminal daemon of the respective second computing device.

16. The system of claim 14, wherein the one or more second devices are further configured to:
  periodically initiate installation of a respective application on a respective second computing device;
  after initiating installation of the respective application, determine that the respective application failed to install, wherein determining that the respective application failed to install indicates that the respective second computing device is in the offline state in which application tests are unable to be performed via the respective remote terminals; and
  based on determining that the respective application failed to install, reset the respective second computing device so as to transition the respective second computing device from the offline state to the online state.

17. The system of claim 14, wherein the one or more second devices are further configured to:
  periodically execute a respective application on a respective second computing device;
  after executing the respective application, determine that the respective application failed to execute, wherein determining that the respective application failed to execute indicates that the respective second computing device is in the offline state in which application tests are unable to be performed via the respective remote terminals; and
  based on determining that the respective application failed to install, reset the respective second computing device so as to transition the respective second computing device from the offline state to the online state.

18. The system of claim 14, wherein the one or more second devices comprise respective wireless communications interfaces, and wherein the one or more second devices are further configured to:
  send, by a respective second computing device to a host via a respective wireless communication interface, an echo request message that requests a response from the host;
  determine that the requested response from the host failed to arrive at the respective wireless communication interface within a pre-determined period of time, wherein determining that that the requested response from the host failed to arrive at the respective wireless communication interface indicates that the respective second computing device is in the offline state in which application tests are unable to be performed via the respective remote terminals; and
  reset the respective wireless communication interface so as to transition the respective second computing device from the offline state to the online state.

19. The system of claim 14, wherein the communications interfaces comprise respective universal serial bus interfaces.

20. The system of claim 14, wherein the one or more second computing devices are further configured to:
  periodically detect respective currents into the respective batteries;
  determine that the detected respective currents into the respective batteries are below a threshold current level; and
  based on determining that the detected respective currents into the respective batteries are below the threshold current level, determine that the one or more second computing devices are in the offline state in which application tests are unable to be performed via the respective remote terminals.

* * * * *